US 011100101B2

(12) United States Patent
Zhao et al.

(10) Patent No.: US 11,100,101 B2
(45) Date of Patent: Aug. 24, 2021

(54) DATA OPERATION METHOD AND DATA MANAGEMENT SERVER

(71) Applicant: Huawei Technologies Co., Ltd., Shenzhen (CN)

(72) Inventors: Qingwei Zhao, Shenzhen (CN); Chong Gu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 16/112,064

(22) Filed: Aug. 24, 2018

(65) Prior Publication Data

US 2018/0365288 A1    Dec. 20, 2018

Related U.S. Application Data

(63) Continuation of application No. PCT/CN2016/111520, filed on Dec. 22, 2016.

(30) Foreign Application Priority Data

Feb. 25, 2016    (CN) .......................... 201610103689.X

(51) Int. Cl.
*G06F 16/30*    (2019.01)
*G06F 16/2453*    (2019.01)
(Continued)

(52) U.S. Cl.
CPC ........ *G06F 16/24532* (2019.01); *G06F 16/00* (2019.01); *G06F 16/21* (2019.01);
(Continued)

(58) Field of Classification Search
CPC ......... G06F 16/24535; G06F 16/24532; G06F 16/2282; G06F 16/00; G06F 16/24539; G06F 16/21; G06F 16/219
(Continued)

(56) References Cited

U.S. PATENT DOCUMENTS 8,495,079 B2    7/2013    Gao et al.
2008/0046480 A1    2/2008    Lou
(Continued)

FOREIGN PATENT DOCUMENTS

CN    1652111 A    8/2005
CN    101256578 A    9/2008
(Continued)

OTHER PUBLICATIONS

Machine Translation and Abstract of Chinese Publication No. CN1652111, Aug. 10, 2005, 13 pages.
(Continued)

*Primary Examiner* — Kuen S Lu
(74) *Attorney, Agent, or Firm* — Conley Rose, P.C.

(57) ABSTRACT

A data operation method and a data management server, where the method includes obtaining an identifier of a tenant and a data operation request for requesting to perform a data operation on data of the tenant, and the data operation request includes a first table name corresponding to the data, determining, according to the identifier and the first table name, a second table name of a data table corresponding to the data and in a first database, where the first database is for storing respective data tables of multiple tenants, the data table of each tenant corresponds to an identifier of each tenant, and the tenant is one of the multiple tenants, replacing the first table name in a first structured query language (SQL) corresponding to the data operation request with the second table name, and requesting the first database to execute the first SQL obtained after the replacement.

20 Claims, 4 Drawing Sheets

(51) Int. Cl.
*G06F 16/21* (2019.01)
*G06F 16/22* (2019.01)
*G06F 16/00* (2019.01)

(52) U.S. Cl.
CPC ........ *G06F 16/219* (2019.01); *G06F 16/2282* (2019.01); *G06F 16/24535* (2019.01); *G06F 16/24539* (2019.01)

(58) Field of Classification Search
USPC ........................................................ 707/718
See application file for complete search history.

(56) References Cited

U.S. PATENT DOCUMENTS

| | | | |
|---|---|---|---|
| 2011/0238709 | A1 | 9/2011 | Liu et al. |
| 2012/0102114 | A1* | 4/2012 | Dunn ..................... G06Q 50/01 709/204 |
| 2012/0173589 | A1 | 7/2012 | Kwon et al. |
| 2012/0310965 | A1 | 12/2012 | Gao et al. |
| 2012/0310989 | A1 | 12/2012 | Weissman et al. |
| 2014/0244680 | A1* | 8/2014 | Chandran ........... G06F 16/2452 707/760 |
| 2015/0066910 | A1* | 3/2015 | Bleach ................ G06F 16/2456 707/722 |
| 2017/0139960 | A1* | 5/2017 | Lober ................ G06F 16/2282 |
| 2017/0169068 | A1* | 6/2017 | Kennedy, Jr. ......... G06F 16/245 |
| 2017/0193036 | A1* | 7/2017 | Yueh ..................... G06F 3/0482 |

FOREIGN PATENT DOCUMENTS

| | | |
|---|---|---|
| CN | 101777057 A | 7/2010 |
| CN | 102193922 A | 9/2011 |
| CN | 102467421 A | 5/2012 |
| CN | 102737020 A | 10/2012 |
| CN | 102929899 A | 2/2013 |
| CN | 102200977 B | 10/2014 |
| CN | 104216893 A | 12/2014 |
| CN | 104462362 A | 3/2015 |
| CN | 104484621 A | 4/2015 |
| CN | 104679886 A | 6/2015 |
| CN | 104881280 A | 9/2015 |
| CN | 105205053 A | 12/2015 |
| CN | 105335450 A | 2/2016 |

OTHER PUBLICATIONS

Machine Translation and Abstract of Chinese Publication No. CN101256578, Sep. 3, 2008, 7 pages.
Machine Translation and Abstract of Chinese Publication No. CN104216893, Dec. 17, 2014, 25 pages.
Machine Translation and Abstract of Chinese Publication No. CN104462362, Mar. 25, 2015, 18 pages.
Machine Translation and Abstract of Chinese Publication No. CN104484621, Apr. 1, 2015, 8 pages.
Machine Translation and Abstract of Chinese Publication No. CN105205053, Dec. 30, 2015, 13 pages.
Machine Translation and Abstract of Chinese Publication No. CN105335450, Feb. 17, 2016, 15 pages.
Foreign Communication From a Counterpart Application, PCT Application No. PCT/CN2016/111520, English Translation of International Search Report dated Mar. 29, 2017, 2 pages.
Foreign Communication From a Counterpart Application, PCT Application No. PCT/CN2016/111520, English Translation of Written Opinion dated Mar. 29, 2017, 5 pages.
Hui, M., et al., "Supporting Database Applications as a Service," XP031447762, International Conference on Data Engineering, Mar. 29, 2009, pp. 832-843.
Foreign Communication From a Counterpart Application, European Application No. 16891292.1, Extended European Search Report dated Oct. 9, 2018, 9 pages.

* cited by examiner

DATA OPERATION METHOD AND DATA MANAGEMENT SERVER

CROSS-REFERENCE TO RELATED APPLICATIONS

This application is a continuation of International Patent Application No. PCT/CN2016/111520 filed on Dec. 22, 2016, which claims priority to Chinese Patent Application No. 201610103689.X filed on Feb. 25, 2016. The disclosures of the aforementioned applications are hereby incorporated by reference in their entireties.

TECHNICAL FIELD

The present disclosure relates to the field of database technologies, and in particular, to a data operation method and a data management server.

BACKGROUND

Based on an objective of maximizing resource sharing, when data is stored in a database, a software as a service (SaaS) provider preferentially selects a shared database and shared data table mode, that is, data of multiple tenants is stored in one data table in a database at the same time, and a tenant to which data belongs is identified using a tenant identifier field. This can implement a maximum resource sharing degree of the database and minimize resource overheads, thereby maximizing revenues of small- and medium-sized enterprises on a large scale. In other approaches, customized fields of tenants vary greatly in the shared database and shared data table mode, and consequently, a customization requirement of a tenant is excessively complex to implement.

The other approaches provides flexible customization for a tenant but has a problem of data read/write complexity. The complexity should not be perceived by a user. The user only needs to know all fields (a baseline field and a customized field of a tenant) in a table, and does not need to concern about a complex data storage model for database extension. To avoid complexity of data processing performed by a tenant and improve development efficiency, in an existing data management model, a data operation structured query language (SQL) submitted by a user needs to be first parsed, and according to customized metadata, translated and rewritten into an SQL for an actual storage model. This step is usually relatively complex, and needs to be repeated for each SQL request. As a result, a large quantity of performance resources are consumed and system performance is reduced upon high concurrency. In addition, because multiple tenants share a data table, a tenant identifier (also referred to as ID) is added for filtering when the SQL is rewritten in order to isolate tenant data. However, the isolation is merely logical, and the data is not physically isolated. In this case, there may be a phenomenon that before a tenant ID is added for filtering, filtering performed according to the tenant ID is bypassed by means of an attack method such as SQL injection. Data leakage interference between tenants occurs, and therefore a potential data security risk exists.

SUMMARY

The present disclosure provides a data operation method and a data management server in order to avoid a complex SQL rewriting process, improve data operation efficiency, and in addition, ensure data security of a tenant.

According to a first aspect, the data operation method is provided, and the method includes obtaining an identifier of a tenant and a data operation request, where the data operation request is used to request to perform a data operation on data of the tenant, and the data operation request includes a first table name corresponding to the data, determining, according to the identifier of the tenant and the first table name, a second table name of a data table that is corresponding to the data and that is in a first database, where the first database is used to store respective data tables of multiple tenants, the data table of each tenant corresponds to an identifier of each tenant, and the tenant is one of the multiple tenants, replacing the first table name in a first SQL corresponding to the data operation request with the second table name, and requesting the first database to execute the first SQL obtained after the replacement in order to complete the data operation on the data. The data operation is a read operation or a write operation.

Optionally, obtaining an identifier of a tenant includes receiving the identifier of the tenant that is sent by a SaaS application server.

Optionally, obtaining a data operation request includes receiving the data operation request sent by the SaaS application server.

It should be noted that the data operation request may be an SQL or another query language such as a domain specific language (DSL).

When the data operation request is the SQL, the first SQL is the data operation request itself, and when the data operation request is another query language, the method further includes converting the data operation request into the SQL in order to obtain the first SQL.

Optionally, the first database is a memory database. Data operation performance can be further improved by means of memory computation.

In the present disclosure, the data management server only needs to replace a table name corresponding to data in an SQL with a table name that is corresponding to the data and that is in a database, and request the database to execute an SQL obtained after the replacement in order to perform a data operation on the data. This can avoid a complex SQL rewriting process and improve data operation efficiency. In addition, data tables of all tenants are mutually isolated in the database, and this can prevent data interference between the tenants and ensure data security.

With reference to the first aspect, in a first possible implementation of the first aspect, before obtaining the first SQL, the method further includes obtaining metadata of a baseline table, generating the second table name according to the identifier of the tenant and a table name of the baseline table, generating a second SQL according to the second table name and the metadata of the baseline table, where the second SQL is used to create the data table, and requesting the first database to execute the second SQL.

In this way, the data table can be created for the tenant in the first database.

For example, when detecting that the tenant activates a service, the data management server may be configured to generate the second table name according to the identifier of the tenant and the table name of the baseline table, and generate, according to the second table name and the metadata of the baseline table, the second SQL used to create the data table. In this case, the data table includes a baseline field.

Optionally, when the data table created by the first database cannot meet a requirement of the tenant, the data management server may obtain a request that is for updating the data table and that is submitted (for example, submitted using the SaaS application server) by the tenant. The request may include metadata of a customized field of the tenant. The data management server generates, according to the metadata of the customized field of the tenant, an SQL used to update the data table, and requests the first database to execute the SQL in order to complete an update and extension of the data table of the tenant. This can satisfy flexible extension of a table structure when multiple tenants share the database. In this case, the data table includes the baseline field and the customized field of the tenant.

With reference to the first aspect or the first possible implementation of the first aspect, in a second possible implementation of the first aspect, the data operation is a write operation, and the method further includes obtaining data update information of the data table, and backing up updated data in the data table according to the data update information of the data table.

The data update information may include an updated field name and an updated value.

When a write operation is performed on the data table in the first database, data in the data table is changed. In this case, the data update information of the data table is obtained and the updated data in the data table is backed up in order to ensure persistent data storage.

Optionally, when the data operation is a read operation, a data read operation is performed on the data table in the first database, and in this case, the data in the data table does not change.

The data in the data table of the tenant that is stored in the first database is backed up in order to ensure data security and persistent data storage.

With reference to the second possible implementation of the first aspect, in a third possible implementation of the first aspect, backing up updated data in the data table according to the data update information of the data table includes requesting, according to the data update information of the data table, a second database to update backup data in the data table.

The second database is used to back up data in the data tables of the multiple tenants in the first database. The first database may be referred to as a primary database, and the second database may be referred to as a secondary database.

With reference to the third possible implementation of the first aspect, in a fourth possible implementation of the first aspect, in the second database, data in the respective data tables of the multiple tenants is stored in a shared service data table, and requesting, according to the data update information, a second database to update backup data in the data table includes obtaining the metadata of the baseline table, generating a third SQL according to the data update information and the metadata of the baseline table, where the third SQL is used to update the data of the data table in the service data table, and requesting the second database to execute the third SQL.

Optionally, if the data table is a data table updated according to the customized field of the tenant, in this case, the data table includes the customized field of the tenant, and the method further includes obtaining the metadata of the customized field of the tenant and mapping metadata, where the mapping metadata is used to indicate a field that is corresponding to the customized field of the tenant in the data table and that is in the service data table, and generating a third SQL according to the data update information and the metadata of the baseline table includes generating the third SQL according to the data update information, the metadata of the baseline table, the metadata of the customized field of the tenant, and the mapping metadata.

In the second database, a shared service data table may be used to store the data in the data tables of the multiple tenants. In this case, a data model of the second database is different from a data model of the first database, and therefore, the data management server needs to generate, according to the data update information in the first database, an SQL that is applicable to the second database, to update data in the second database.

Optionally, the second database may further separately store the data tables of the multiple tenants, that is, the second database may use a data model same as that of the first database to store the data of the multiple tenants. In this case, the data management server requests the second database to execute the first SQL obtained after the replacement in order to complete the data operation on the data.

With reference to any one of the second to the fourth possible implementations of the first aspect, in a fifth possible implementation of the first aspect, obtaining data update information of the data table includes parsing the first SQL obtained after the replacement and obtaining the data update information of the data table, or reading a log file to obtain the data update information of the data table.

For example, the data management server may periodically detect a first database connection to obtain the SQL of the data operation. Alternatively, the data management server may periodically read update time or a file size of the log file to determine that a log is changed, and read changed data for analysis in order to obtain the data update information.

With reference to any one of the first aspect or the foregoing possible implementations of the first aspect, in a sixth possible implementation of the first aspect, the method further includes generating a fourth SQL according to changed metadata of the baseline table and/or changed metadata of the customized field of the tenant when the metadata of the baseline table and/or metadata of a customized field of the tenant that are in the first database is changed, where the fourth SQL is used to update the data table, and requesting the first database to execute the fourth SQL.

The SQL is generated according to the changed metadata of the baseline table and/or the changed metadata of the customized field of the tenant, and the SQL is executed in the first database in order to implement a baseline table upgrade and/or synchronization of a data table re-customized by the tenant.

According to a second aspect, a data management server is provided and includes a unit for executing the method according to any one of the first aspect or the possible implementations of the first aspect.

According to a third aspect, a data management server is provided, including a processor, a memory, and a bus system, where the processor and the memory are connected using the bus system, the memory is configured to store an instruction, and the processor is configured to execute the instruction stored in the memory such that the data management server executes the method according to any one of the first aspect or the possible implementations of the first aspect.

According to a fourth aspect, a computer readable storage medium is provided, the computer readable storage medium stores a program, and the program enables a data management server to execute the method according to any one of the first aspect or the possible implementations of the first aspect.

According to a fifth aspect, a computer program product is provided, the computer program product includes computer program code, and when the computer program code is run by a data management server, the data management server can execute the method according to any one of the first aspect or the possible implementations of the first aspect.

In the present disclosure, the data management server only needs to replace a table name corresponding to data in an SQL with a table name that is corresponding to the data and that is in a database, and request the database to execute an SQL obtained after the replacement in order to perform a data operation on the data. This can avoid a complex SQL rewriting process and improve data operation efficiency. In addition, data tables of all tenants are mutually isolated in the database, and this can prevent data interference between the tenants and ensure data security.

DESCRIPTION OF EMBODIMENTS

Figure 1:
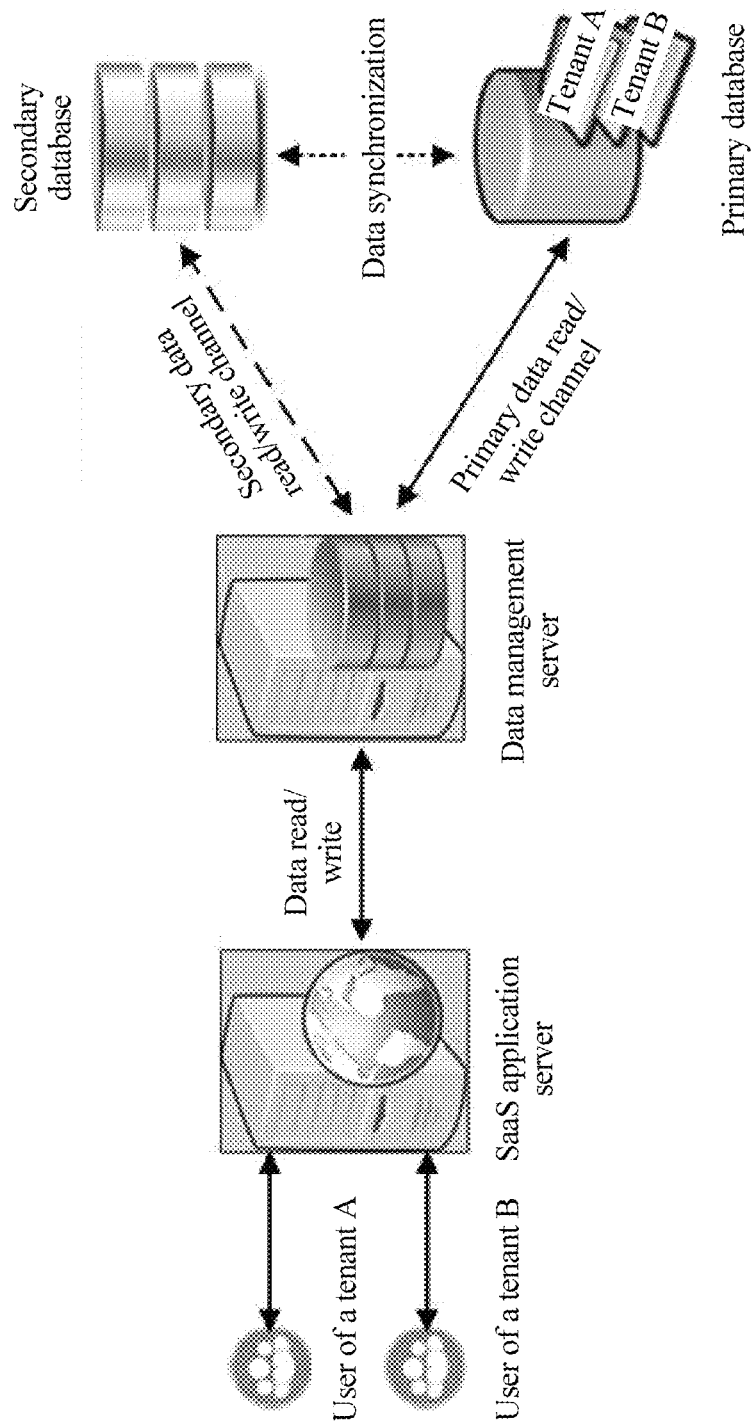
FIG. 1 is a schematic diagram of network deployment according to an embodiment of the present disclosure.

The following describes the technical solutions in embodiments of the present disclosure with reference to accompanying drawings in the embodiments of the present disclosure.

To easily understand the embodiments of the present disclosure, terms used in description of the embodiments of the present disclosure are first described herein.

Metadata of a baseline table: information description for defining the baseline table, including but not limited to a table name, a field name, a field type, an index, a primary key, and a foreign key.

Metadata of a customized field: information description for defining the customized field, including but not limited to a field name, a field type, and an index.

Metadata of a customized table: information description for defining the customized table, including but not limited to a table name, a field name, a field type, an index, a primary key, and a foreign key. The customized table includes multiple customized fields.

Tenant: an enterprise that subscribes and uses a SaaS application system. An employee of the enterprise is a user.

For example, the field type may be "int," "string," or the like. In an example in which a data table of a tenant is an employee table, field names in the data table of the tenant may include Name, Age, Gender, Tel (i.e., telephone number), and the like.

In the following, a field in a baseline table is described as a baseline field. A data table created in a database for each tenant includes a baseline field, and may further include a customized field of the tenant according to a personalized customization requirement of the tenant.

According to the embodiments of the present disclosure, in a database shared by multiple tenants, tenant-oriented data modeling is performed, that is, a tenant-specific data model is established according to a customized extension model of a tenant in order to provide data read/write for the tenant. Data of each tenant is stored in an independent data table, and the data table of each tenant corresponds to an identifier of each tenant such that physical isolation is formed between data tables of all tenants. That is, each data table stores data of only one tenant, and each data table includes a baseline field and all customized fields of one tenant. In addition, a data read/write operation of a tenant is redirected to a data table of the tenant in the database without requiring a complex SQL parsing and rewriting process, and this improves operation flexibility. In addition, physically isolating a data table of a tenant can avoid data leakage interference and ensure data security.

To ensure persistent data storage, a data table of a tenant that is stored in the database may further be backed up.

For example, data of all tenants in the database may be backed up in a file storage manner, for example, file storage in a JAVASCRIPT Object Notation (JSON) format or an Extensible Markup Language (XML) format may be used. The data of all the tenants in the database may be backed up in a magnetic disk storage manner.

The data of the tenants may be backed up using another database. For example, a primary database is used to store respective data tables of multiple tenants, the data table of each tenant corresponds to an identifier of each tenant, and a secondary database is used to back up data of the tenants that is stored in the primary database. For example, all tenants in the secondary database may share a service data table, and the service data table includes data in data tables of all the tenants, or the secondary database may store the data tables of the multiple tenants according to a data model in the primary database.

FIG. 1 is a schematic diagram of network deployment according to an embodiment of the present disclosure. It should be noted that, in FIG. 1, that a secondary database backs up data of a primary database is merely used as an example for description, and the data in the primary database may also be backed up in the foregoing other manners.

A user of a tenant may initiate a data operation request using a SaaS application server.

The SaaS application server may request, according to an identifier of the tenant to which the user initiating the data operation request belongs, a data management server to read/write data by tenant.

The data management server may monitor a connection initiated by the SaaS application server, obtain a data operation request initiated by a tenant, and request the primary database to execute a corresponding data operation. The data management server may request, according to metadata of a baseline table and metadata of a customized field of a tenant, the primary database to create a data table including the baseline field and the customized field of the tenant.

The primary database performs tenant-oriented data modeling, that is, establishes a tenant-specific data model according to a customized extension model of a tenant in order to provide a data operation for the tenant. Data read and write of a tenant are both redirected to a data table of the tenant in a database, and this can avoid a complex SQL rewriting process and improve data operation efficiency. The primary database may include respective data tables of multiple tenants. The data table of each tenant corresponds to an identifier of each tenant. The primary database may execute a corresponding data operation on a data table of a tenant according to a request of the data management server.

Physical isolation is formed between the data tables of the tenants such that the tenants can perform a data operation only on the respective data tables of the tenants, and this prevents data interference between the tenants and ensures data security of the tenants.

The data table of each tenant may include a baseline table field and a customized field of the tenant. Types of the baseline table field and the customized field of the tenant may be the same.

The secondary database may be used to back up data of the primary database. For example, the secondary database may store a service data table shared by multiple tenants, and the service data table includes data of data tables of the multiple tenants in the database, and isolates the tenant data using values of tenant identifier fields. In the secondary database, a table structure may be kept unchanged, and the data of the multiple tenants may be stored using a fixed model in order to implement stable and permanent storage of the data in the primary database.

When the primary database performs a data operation on a data table, for example, a data write operation on the data table, write data is updated in an asynchronous manner to the secondary database for storage. For example, after the data management server detects that the primary database completes a data operation on data and feeds back an operation result to the SaaS application server, the data management server requests the secondary database to perform the data operation in the primary database.

In addition, to ensure data synchronization between the primary database and the secondary database, if the secondary database fails to perform a process of backing up updated data, the data management server may further request the primary database to restore the data to a value before updating.

It should be noted that, when the primary database is available, the data management server may preferentially perform the data operation in the primary database. When the primary database is unavailable, the data management server may directly request, using SQL translation and rewriting, the secondary database to perform the data operation.

In this embodiment of the present disclosure, a two-level database including the primary database and the secondary database may be established. The secondary database is used as a first-level database to establish a tenant data extension model, and according to the extension model, store the tenant data and ensure a fix data structure. The primary database is used as a second-level database to perform tenant-oriented data modeling, that is, establish a tenant-specific data model according to a tenant customized extension model in order to provide data read/write for a tenant. Data read/write of all the tenants is redirected to the data tables of the tenants in the primary database, and this can avoid a complex SQL rewriting process, improve data operation efficiency, and in addition, ensure data security of the tenants.

Figure 2:
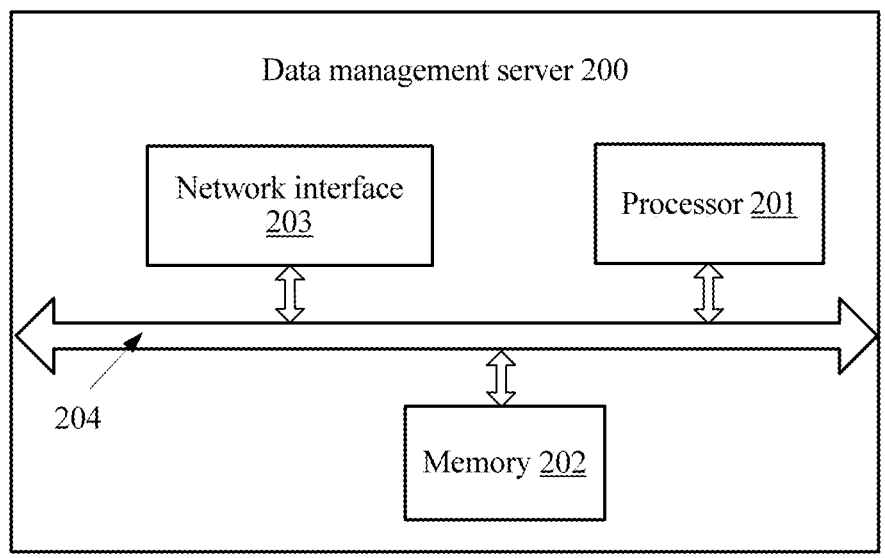
FIG. 2 is a schematic structural diagram of a data management server according to an embodiment of the present disclosure.

FIG. 2 is a schematic structural diagram of a data management server 200 according to an embodiment of the present disclosure. As shown in FIG. 2, the data management server 200 may include a processor 201, a memory 202, a network interface 203, and a bus system 204.

The data management server 200 may communicate with a SaaS application server using the network interface 203.

The processor 201 controls an operation of the data management server 200, and the processor 201 may further be referred to as a central processing unit (CPU). The memory 202 may include a read-only memory (ROM) and a random access memory (RAM), and provides an instruction and data for the processor 201. A part of the memory 202 may further include a nonvolatile RAM (NVRAM). In a specific application, all components of a data management server 200 are coupled together using the bus system 204, and in addition to a data bus, the bus system 204 may further include a power supply bus, a control bus, a status signal bus, and the like. However, for clarity of description, various buses are marked as the bus system 204 in FIG. 2.

In this embodiment of the present disclosure, the processor 201 may invoke an operation instruction stored in the memory 202 such that the data management server 200 executes a corresponding procedure of the data operation method according to the embodiments of the present disclosure. For details, refer to relevant description of a data operation method 300 according to an embodiment of the present disclosure shown in the following FIG. 3. To avoid repetition, details are not described herein.

The data operation method 300 disclosed in the following embodiment of the present disclosure may be applied to the processor 201, or implemented by the processor 201. The processor 201 may be an integrated circuit chip and has a signal processing capability. In an implementation process, each step in the foregoing method may be completed using an integrated logic circuit of hardware in the processor 201 or an instruction in a form of software. The foregoing processor 201 may be a general purpose processor, a digital signal processor (DSP), an application-specific integrated circuit (ASIC), a field programmable gate array (FPGA) or another programmable logic device, a discrete gate or transistor logic device, or a discrete hardware component. Methods, steps, and logical block diagrams disclosed in the embodiments of the present disclosure may be implemented or executed. The general purpose processor may be a microprocessor or this processor may be any normal processor, or the like. Steps of the methods disclosed with reference to the embodiments of the present disclosure may be directly executed and completed using a hardware decoding processor, or may be executed and completed by means of a combination of hardware and software modules in a decoding processor. The software module may be located in a mature storage medium in the field, such as a RAM, a flash memory, a ROM, a programmable ROM (PROM), an electrically-erasable PROM (EEPROM), or a register. The storage medium is located in the memory 202, and the processor 201 reads information in the memory 202 and completes the steps of the method disclosed in the embodiments of the present disclosure in combination with hardware of the processor 201.

The memory 202 may further store data required for creating a data table, such as metadata of a baseline table, metadata of a customized field, metadata of a customized table, and mapping metadata.

Figure 3:
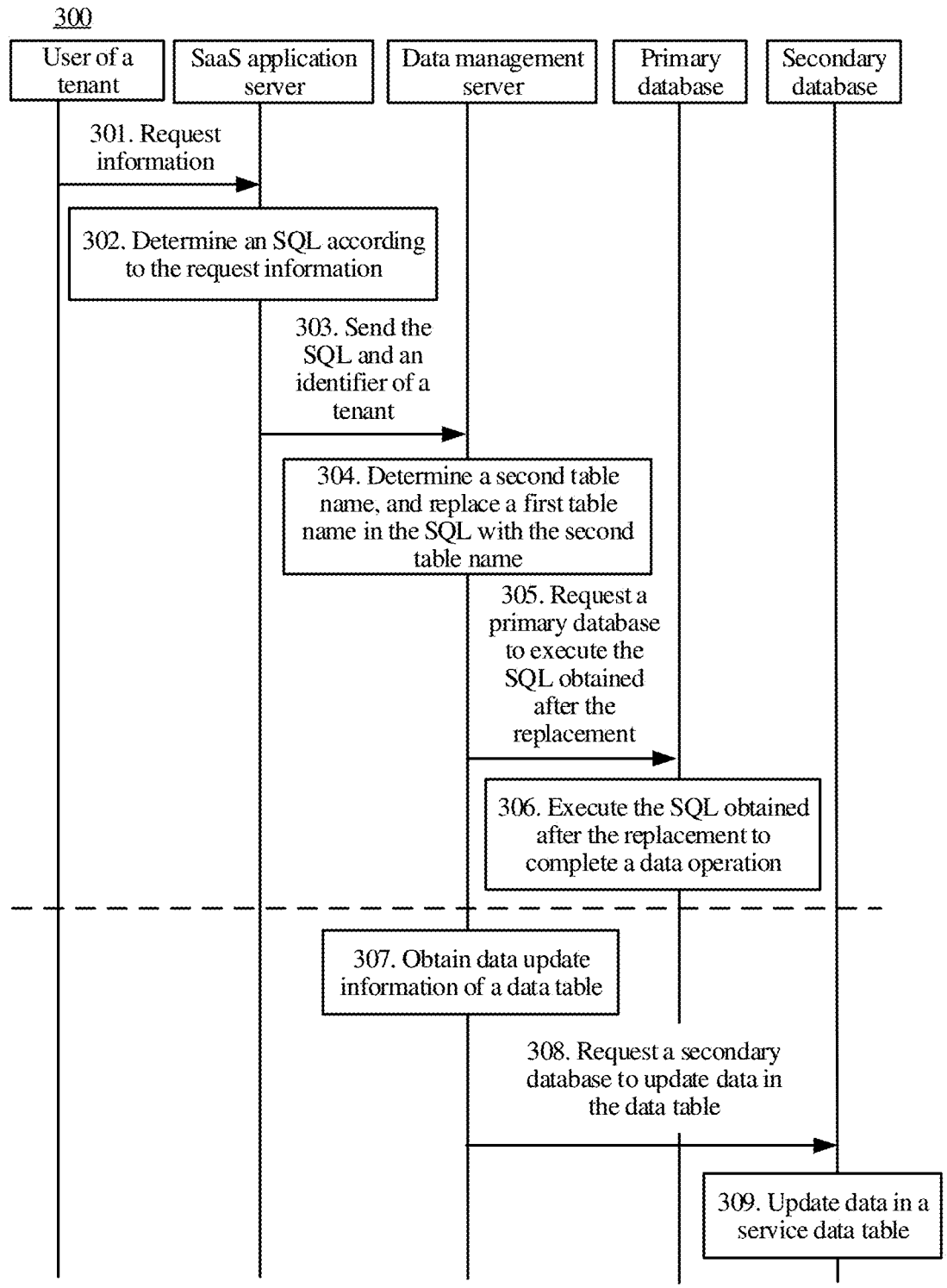
FIG. 3 is a schematic flowchart of a data operation method according to an embodiment of the present disclosure.

FIG. 3 is a schematic flowchart of the data operation method 300 according to an embodiment of the present disclosure. As shown in FIG. 3, the data operation method 300 includes the following steps.

Step 301. A user of a tenant submits request information to a SaaS application server and requests to perform a data operation on data of the tenant.

Further, the data operation is a read operation or a write operation.

Step 302. The SaaS application server determines, according to the request information submitted by the user, an SQL corresponding to the data operation, where the SQL includes a first table name corresponding to the data.

The first table name may be a table name learned by the tenant. For example, the first table name may be a table name presented to the tenant. The first table name may be the same as a table name of a baseline table.

In addition, the SaaS application server may further determine, according to an identifier of the user, an identifier of the tenant to which the user belongs.

Step 303. The SaaS application server establishes a connection to a data management server and sends the SQL to the data management server.

Optionally, the SaaS application server may further send the identifier of the tenant to the data management server.

It should be noted that the SaaS application server may send the SQL and the identifier of the tenant at the same time, or separately send the SQL and the identifier of the tenant, and this embodiment of the present disclosure sets no limitation thereto.

Step 304. The data management server receives the SQL and the identifier of the tenant that are sent by the SaaS application server, determines, according to the identifier of the tenant and the first table name, a second table name of a data table that is corresponding to the data and that is in a primary database, and replaces the first table name in the SQL with the second table name.

The second table name is a table name of the data table that is corresponding to the data and is stored in the primary database. The first table name is irrelevant to the identifier of the tenant, and the second table name is relevant to the identifier of the tenant. For example, the first table name is "employee table," and the second table name is "employee table-tenant A."

Step 305. The data management server requests the primary database to execute the SQL obtained after the replacement.

Step 306. The primary database executes the SQL obtained after the replacement and completes the data operation on the data of the tenant.

Further, the primary database determines, according to the second table name, a data table on which the data operation is to be performed, and performs the data operation on data in the data table.

In this embodiment of the present disclosure, the data management server only needs to replace a table name corresponding to data in an SQL with a table name that is corresponding to the data and that is in a database, and request the database to execute an SQL obtained after the replacement in order to perform a data operation on the data. This can avoid a complex SQL rewriting process and improve data operation efficiency. In addition, data tables of all tenants are mutually isolated in the database, and this can prevent data interference between the tenants and ensure data security.

It should be noted that, when the data operation is a write operation, because the data of the data table in the primary database is changed, changed information needs to be synchronized to a secondary database. In this case, the following steps 307-309 further needs to be executed.

Step 307. The data management server obtains data update information of the data table.

The data update information may include an updated field name and an updated value.

Step 308. The data management server requests, according to the data update information of the data table, a secondary database to update stored data.

For example, in the secondary database, data of multiple tenants is stored in a shared service data table. Further, the data management server may obtain metadata of a baseline table, metadata of a customized field of a tenant, and mapping metadata. The mapping metadata is used to indicate a field that is corresponding to the customized field of the tenant in the data table and that is in the service data table stored in the secondary database, generate an SQL according to the data update information, the metadata of the baseline table, the metadata of the customized field of the tenant, and the mapping metadata, where the SQL is used to update the data table, and request the secondary database to execute the SQL.

For example, the mapping metadata may include an identifier of a tenant and a correspondence between a customized field of the tenant and a field in the service data table. FIG. 1 shows an example of metadata of customized fields of tenants, FIG. 2 shows an example of mapping metadata, FIG. 3 shows an example of the service data table shared by the tenants in the secondary database, and a field that is corresponding to a customized field of each tenant and that is in the service data table may be determined according to FIG. 2.

TABLE 1

| Tenant | Table name | Field name | Type |
| --- | --- | --- | --- |
| A | Employee table | Sex | string |
| B | Employee table | Age | int |
| B | Employee table | ID | string |
| C | Employee table | QQ | string |
| C | Employee table | Telephone number | string |
| C | Employee table | Age | int |

TABLE 2

| Tenant name | Table name | Field name | Mapped field |
| --- | --- | --- | --- |
| A | Employee table | Sex | flex0 |
| B | Employee table | Age | flex0 |
| B | Employee table | ID | flex1 |
| C | Employee table | QQ | flex0 |
| C | Employee table | Telephone number | flex1 |
| C | Employee table | Age | flex2 |

TABLE 3

| Tenant | Table name | flex0 | flex1 | flex2 | ... | flex n |
| --- | --- | --- | --- | --- | --- | --- |
| A | Employee table | Male | | | | |
| B | Employee table | 25 | 100A | | | |
| C | Employee table | 1452 | 135 | ... | 30 | |

It should be noted that, if the data table of the tenant includes only a baseline field, the data management server generates, according to the data update information and the metadata of the baseline table, an SQL used to update the data, and requests the secondary database to execute the SQL, to complete an update.

Step 309. The secondary database updates data in a service data table.

It should be noted that, before step 301, the data management server further needs to create a data table for each tenant in the primary database. Further, the data management server generates, according to the identifier of the tenant and the table name of the baseline table, a table name (that is, the second table name) of the data table that is of the tenant and that is stored in the primary database, generates, according to the table name of the data table of the tenant and the metadata of the baseline table, an SQL used to create the data table of the tenant, and requests the primary database to execute the SQL to create the data table of the tenant. In this case, the created data table of the tenant includes only a baseline field.

Optionally, when the data table created by the first database cannot meet a requirement of the tenant, the tenant may submit (for example, submit using the SaaS application server) a request for updating the data table, and accordingly, the data management server may obtain the request for updating the data table. The request may include the metadata of the customized field of the tenant. The data management server generates, according to the metadata of the customized field of the tenant, an SQL used to update the data table, and requests the first database to execute the SQL in order to complete an update and extension of the data table of the tenant. This can satisfy flexible extension of a table structure when multiple tenants share the database. In this case, an updated data table includes the baseline field and the customized field of the tenant.

Optionally, when the secondary database is initially started, if the secondary database detects that data table creation has been completed in the primary database, the secondary database synchronizes initial data to the data table of the tenant in the primary database by tenant. After the initial data is synchronized to the data table of the tenant, the user may perform the data operation on the data table in the primary database using the data management server. The initial data may include system general data and data required for initialization operation.

Accordingly, the data management server may receive a data synchronization request of the secondary database and requests, according to the data synchronization request, the primary database to synchronize the initial data to the data table created for the tenant.

Figure 4:
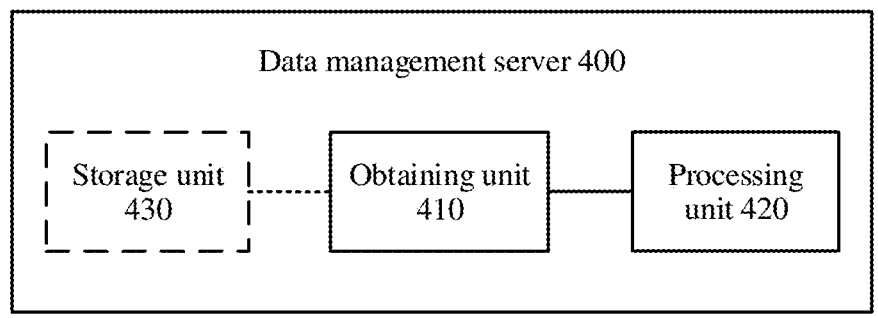
FIG. 4 is a schematic structural diagram of a data management server according to another embodiment of the present disclosure.

FIG. 4 is a schematic structural diagram of a data management server according to an embodiment of the present disclosure. As shown in FIG. 4, a data management server 400 includes an obtaining unit 410 and a processing unit 420.

The obtaining unit 410 is configured to obtain an identifier of a tenant and a data operation request, where the data operation request is used to request to perform a data operation on data of the tenant, and the data operation request includes a first table name corresponding to the data.

The processing unit 420 is configured to determine, according to the identifier of the tenant and the first table name that are obtained by the obtaining unit 410, a second table name of a data table that is corresponding to the data and that is in a first database, where the first database is used to store data tables of multiple tenants, the data table of each tenant corresponds to an identifier of each tenant, and the tenant is one of the multiple tenants.

The first database may be a memory database, and this can further improve read/write operation efficiency of the data.

The processing unit 420 is further configured to replace the first table name in a first SQL corresponding to the data operation request with the second table name, and request the first database to execute the first SQL obtained after the replacement in order to complete the data operation on the data in the data table.

In this embodiment of the present disclosure, the data management server only needs to replace a table name in an SQL with a table name in a database, and request the database to execute the SQL obtained after the replacement in order to perform a read/write operation on data. This can avoid a complex SQL rewriting process and improve data operation efficiency. In addition, data tables of all tenants are mutually isolated in the database, and this can prevent data interference between the tenants and ensure data security.

Optionally, the obtaining unit 410 is further configured to obtain metadata of a baseline table before the first SQL is obtained. Correspondingly, the processing unit 420 is further configured to generate the second table name according to the identifier of the tenant and a table name of the baseline table, generate a second SQL according to the second table name and the metadata of the baseline table, where the second SQL is used to create the data table, and request the first database to execute the second SQL.

Optionally, the data management server 400 may further include a storage unit 430, where the storage unit 430 may be configured to store data required for creating the data table of the tenant, such as the metadata of the baseline table and metadata of a customized field of the tenant. The obtaining unit 410 may be further configured to obtain the metadata of the baseline table and the metadata of the customized field of the tenant from the storage unit 430.

Optionally, the data operation is a write operation. Correspondingly, the obtaining unit 410 is further configured to obtain data update information of the data table, and the processing unit 420 is further configured to back up updated data in the data table according to the data update information of the data table.

Optionally, the processing unit 420 is further configured to request, according to the data update information of the data table, a second database to update backup data in the data table.

Optionally, in the second database, data in respective data tables of the multiple tenants may be stored in a shared service data table. Correspondingly, the obtaining unit 410 is further configured to obtain the metadata of the baseline table. The processing unit 420 is further configured to generate a third SQL according to the data update information and the metadata of the baseline table, where the third SQL is used to update data of the service data table stored in the second database, and request the second database to execute the third SQL.

Optionally, the obtaining unit 410 is further configured to obtain the data update information of the data table according to the first SQL obtained after the replacement, or obtain the data update information of the data table according to a log file.

Optionally, the processing unit 420 is further configured to when the metadata of the baseline table in the first database and/or the metadata of the customized field of the tenant is changed, generate a fourth SQL according to changed metadata of the baseline table and/or changed metadata of the customized field of the tenant, where the fourth SQL is used to update the data table, and request the first database to execute the fourth SQL.

According to this embodiment of the present disclosure, the data management server 400 may be corresponding to the data management server in the method 300, and the foregoing and another operation and/or function of each unit in the data management server 400 are separately used to implement a corresponding procedure of the method 300 shown in FIG. 3. For brevity, details are not repeatedly described herein.

It should be noted that, in this embodiment of the present disclosure, the obtaining unit 410 and the processing unit 420 may be implemented by the processor 201 in the data management server 200 shown in FIG. 2. The storage unit 430 may be implemented by the memory 202 in the data management server 200 shown in FIG. 2.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A data operation method implemented by a server and comprising:
   obtaining an identifier of a tenant and a data operation request, the data operation request requesting to perform a data operation on data of the tenant, and the data operation request comprising a first table name corresponding to the data;
   determining, according to the identifier of the tenant and the first table name, a second table name of a data table in a first database corresponding to the data, the first database storing respective data tables of a plurality of tenants, a data table of each tenant corresponding to an identifier of each tenant, and the tenant comprising one of the tenants;
   replacing, without interfacing with a user and without performing a rewriting process of a first structured query language (SQL), the first table name in the first SQL corresponding to the data operation request with the second table name; and
   requesting the first database to execute the first SQL after replacing the first table name with the second table name to complete the data operation on the data.

2. The data operation method of claim 1, wherein before obtaining the identifier of the tenant and the data operation request, the data operation method further comprising:
   obtaining metadata of a baseline table;
   generating the second table name according to the identifier of the tenant and a table name of the baseline table;
   generating a second SQL according to the second table name and the metadata of the baseline table, the second SQL creating the data table; and
   requesting the first database to execute the second SQL.

3. The data operation method of claim 2, wherein the data operation comprises a write operation, and the data operation method further comprising:
   obtaining data update information of the data table; and
   backing up updated data in the data table according to the data update information of the data table.

4. The data operation method of claim 3, wherein backing up the updated data in the data table comprises requesting, according to the data update information of the data table, a second database to update backup data in the data table.

5. The data operation method of claim 4, wherein in the second database, data in the respective data tables of the tenants are stored in a shared service data table, and wherein requesting the second database to update the backup data in the data table comprises:
   obtaining the metadata of the baseline table;
   generating a third SQL according to the data update information and the metadata of the baseline table, the third SQL updating data of the service data table stored in the second database; and
   requesting the second database to execute the third SQL.

6. The data operation method of claim 3, wherein obtaining the data update information of the data table comprises obtaining the data update information of the data table according to the first SQL after replacing the first table name with the second table name.

7. The data operation method of claim 3, wherein obtaining the data update information of the data table comprises obtaining the data update information of the data table according to a log file.

8. The data operation method of claim 2, further comprising:
generating a fourth SQL according to changed metadata of the baseline table and changed metadata of a customized field of the tenant when the metadata of the baseline table and the metadata of the customized field of the tenant are changed, the fourth SQL updating the data table; and
requesting the first database to execute the fourth SQL.

9. The data operation method of claim 2, further comprising:
generating a fourth SQL according to changed metadata of the baseline table when the metadata of the baseline table is changed, the fourth SQL updating the data table; and
requesting the first database to execute the fourth SQL.

10. The data operation method of claim 1, further comprising:
generating a fourth SQL according to changed metadata of a customized field of the tenant when the metadata of the customized field of the tenant is changed, the fourth SQL updating the data table; and
requesting the first database to execute the fourth SQL.

11. A data management server comprising:
a computer-readable storage medium configured to store programming instructions; and
a processor coupled to the computer-readable storage medium and configured to execute instructions to:
obtain an identifier of a tenant and a data operation request, the data operation request requesting to perform a data operation on data of the tenant, and the data operation request comprising a first table name corresponding to the data;
determine, according to the identifier of the tenant and the first table name, a second table name of a data table in a first database corresponding to the data, the first database storing respective data tables of a plurality of tenants, a data table of each tenant corresponding to an identifier of each tenant, and the tenant comprising one of the tenants;
replace, without interfacing with a user and without performing a rewriting process of a first structured query language (SQL), the first table name in the first SQL corresponding to the data operation request with the second table name; and
request the first database to execute the first SQL after replacing the first table name with the second table name to complete the data operation on the data.

12. The data management server of claim 11, wherein the processor is further configured to:
obtain metadata of a baseline table before obtaining the identifier of the tenant and the data operation request;
generate the second table name according to the identifier of the tenant and a table name of the baseline table;
generate a second SQL according to the second table name and the metadata of the baseline table, the second SQL creating the data table; and
request the first database to execute the second SQL.

13. The data management server of claim 12, wherein the data operation comprises a write operation, and wherein the processor is further configured to:
obtain data update information of the data table; and
back up updated data in the data table according to the data update information of the data table.

14. The data management server of claim 13, wherein the processor is further configured to request, according to the data update information of the data table, a second database to update backup data in the data table.

15. The data management server of claim 14, wherein in the second database, data in the respective data tables of the tenants are stored in a shared service data table, and wherein the processor is further configured to:
obtain the metadata of the baseline table;
generate a third SQL according to the data update information and the metadata of the baseline table, the third SQL updating data of the service data table stored in the second database; and
request the second database to execute the third SQL.

16. The data management server of claim 13, wherein the processor is further configured to obtain the data update information of the data table according to the first SQL obtained after replacing the first table name with the second table name.

17. The data management server of claim 13, wherein the processor is further configured to obtain the data update information of the data table according to a log file.

18. The data management server of claim 12, wherein the processor is further configured to:
generate a fourth SQL according to changed metadata of the baseline table and changed metadata of a customized field of the tenant when the metadata of the baseline table and the metadata of the customized field of the tenant are changed, the fourth SQL updating the data table; and
request the first database to execute the fourth SQL.

19. The data management server of claim 12, wherein the processor is further configured to:
generate a fourth SQL according to changed metadata of the baseline table or changed metadata of a customized field of the tenant when the metadata of the baseline table or the metadata of the customized field of the tenant is changed, the fourth SQL updating the data table; and
request the first database to execute the fourth SQL.

20. A computer program product comprising instructions for storage on a non-transitory medium and that, when executed by a processor, cause a data management server to:
obtain an identifier of a tenant and a data operation request, the data operation request requesting to perform a data operation on data of the tenant, and the data operation request comprising a first table name corresponding to the data;
determine, according to the identifier of the tenant and the first table name, a second table name of a data table in a first database corresponding to the data, the first database storing respective data tables of a plurality of tenants, a data table of each tenant corresponding to an identifier of each tenant, and the tenant comprising one of the tenants;
replace, without interfacing with a user and without performing a rewriting process of a first structured query language (SQL), the first table name in the first SQL corresponding to the data operation request with the second table name; and
request the first database to execute the first SQL after replacing the first table name with the second table name to complete the data operation on the data.

* * * * *